June 2, 1931.    W. J. McCARTHY    1,808,471
WASTE TRAP
Filed Nov. 14, 1925
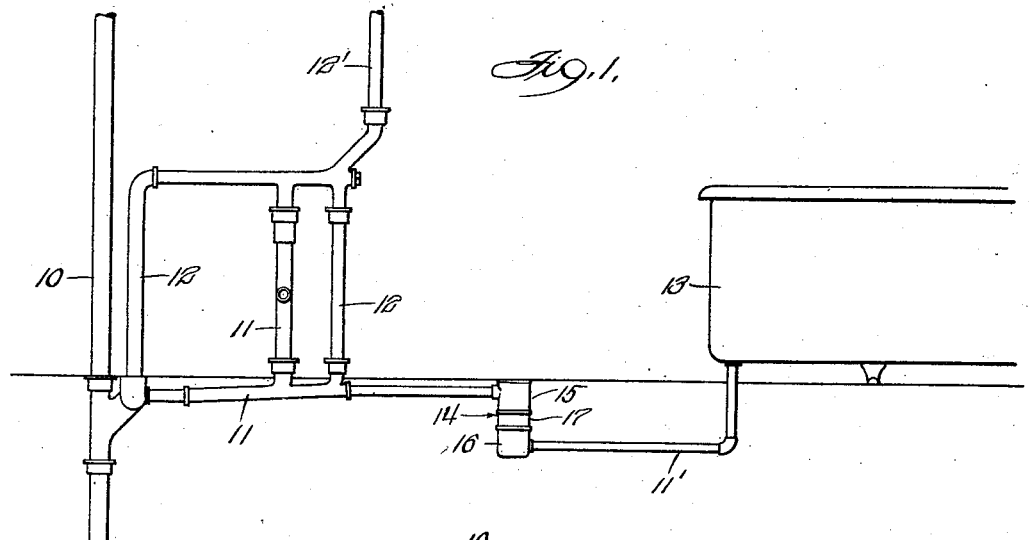
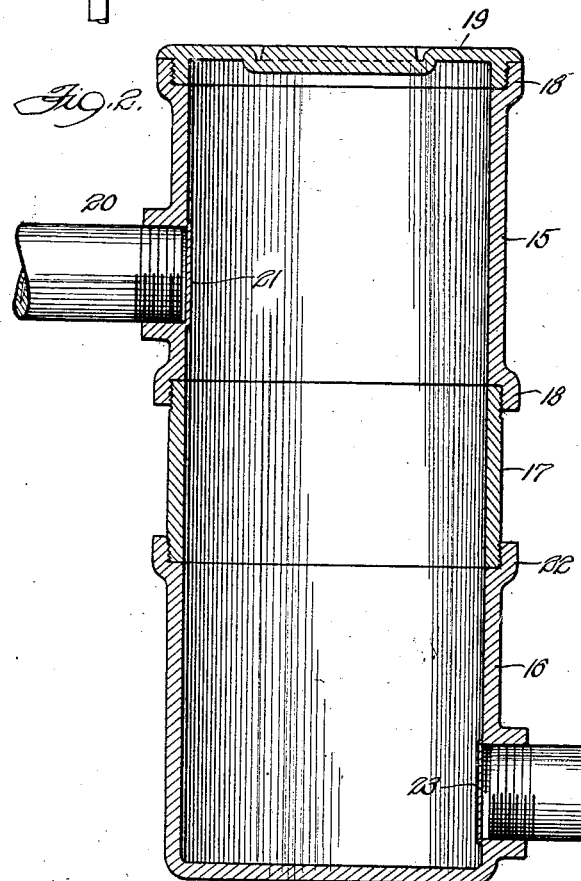
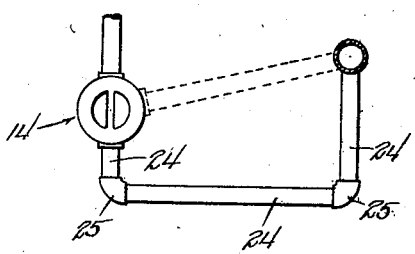
Inventor:
WILLIAM J. McCARTHY Patented June 2, 1931

1,808,471

UNITED STATES PATENT OFFICE

WILLIAM J. McCARTHY, OF CHICAGO, ILLINOIS

WASTE TRAP

Application filed November 14, 1925. Serial No. 68,941

My invention relates to waste traps and relates particularly to waste traps adapted to form a water seal in order to prevent the escapement of sewage gases into a building. This invention, known to those well versed in the art as a drum trap, but for the purposes of this specification, referred to as a waste trap, has overcome many disadvantages in the present art. It is an ever-increasing tendency on the part of builders to have all plumbing hidden from view in order to increase the artistic appearance of the room in a building. The heretofore ordinary usage of S fittings to form water seals in the waste-pipes has become an eyesore, as these fittings cannot be positioned within the walls, but must be placed at some advantageous place for their regulation, usually spaced from the wall in full view.

The elimination of the foregoing disadvantage may be accomplished by the use of the ordinary lead drum trap, which comprises a hollow one-piece casting having an inlet and an outlet, and is positioned below the floor and projects therethrough in order to be accessible to the attendant for any necessary adjustment in the plumbing. The waste-pipe leads from the fixture to the drum trap where a water seal is formed, and thence on to the main waste pipe or stack.

This device also has its disadvantages. The piping necessary for this system must necessarily be placed beneath the flooring, and as the openings for the inlet and for the outlet to the drum traps are fixed, the piping must be adapted to fit the drum trap. This necessitates the use of many extra fittings and more pipe as the structure of the floor must not be weakened by cutting away suitable portions, or passing through, but must be carried around. Then, again, in order to suit the more common needs, the openings for the inlet and outlet pipes are positioned on opposite sides of the trap. With the stack in certain positions with reference to the drum and its fixture, the outlet to the stack must be carried in a round-about manner from one to the other, causing the use of excess fittings.

To overcome the disadvantages apparent from the foregoing, the present invention provides for the adjustment of the openings for the inlet and outlet pipes, to meet the needs of the piping in the rest of the system. This is accomplished in several ways, as hereinafter set forth.

One of the objects of my invention is to provide a waste trap of a design to permit of an axial, angular adjustment between the inlet and outlet pipes.

A further object of my invention is to provide a waste trap of a design to permit of its adjustment in height.

A further object of my invention is to provide a waste trap of a design to permit of an adjustment between the outlet pipe and the level of the floor.

A further object of my invention is to provide a waste trap of a design to permit of the testing of the piping in the sewage system in a completed state.

A further object of my invention is to provide a waste trap of a design which will be simple in form and inexpensive to manufacture.

Further objects and advantages will be apparent from the accompanying drawings, in which:

Figure 1 is a front elevation of a sewage system in which my invention is employed;

Fig. 2 is a vertical sectional view of the waste trap in which my invention is embodied; and Fig. 3 is a diagrammatic plan view of a system illustrating the relative merits of my device as compared with the present practice.

Referring to the drawings, and particularly to Fig. 1 thereof, a single floor of a sewage system is shown comprising a waste stack 10 connected at its lower end to the sewer and extending upwardly to the top of the building. Auxiliary waste pipes 11 extend from the fixtures on each floor to the main stack. In order to permit water seals to be formed, vent pipes 12 are associated with the waste pipes in the ordinary manner to prevent the siphoning of the water in the seals. A main vent pipe $12^1$ extends the full height of the building to which the vent pipes from each floor are connected.

A bath tub 13 is shown with a waste pipe 11¹ at its outlet and is connected at its other end to the bottom chamber of the waste trap 14 where the waste passes through the water seal and thence to the main stack.

Referring now to Fig. 2 of the drawings, the waste trap 14 comprises an upper chamber 15 and a lower chamber 16, connected by means of a nipple 17.

In the construction specifically shown, the upper chamber 15 has an internally threaded flange 18 at each end into which are threaded a cover 19 at its upper end and the nipple 17 at its lower end. An outlet pipe 20 is threaded into an opening in the side of the chamber 15, which opening is adjacent the lower flange. A thin wall 21, integral with the casing, is provided to cover the opening for the outlet pipe. Upon completion of the entire system and after certain plumbing tests, hereinafter described, have been made, this thin partition wall is knocked out so that a clear passage is formed.

The lower chamber 16 is also provided with an internally threaded flange 22 at its upper end which receives the lower end of the nipple 17 in threaded engagement therewith. An inlet pipe is threaded into an opening in the lower portion of the chamber and a thin wall 23 is formed over the opening which is likewise knocked out when the plumbing tests have been made to form a clear passage therethrough. With this construction, the walls of the upper and the lower chamber and the nipple lie in the same plane, thus providing a continuous wall without obstruction. When the chambers are fixed in their desired relation, the receptacle thus formed contains the water, and acts as a water seal preventing the escape of gases from the sewer back into the building.

The nipple 17 may be of any desired height. Beams in different structures vary in height; so the nipple is provided of a height to compensate for this variance in height of the beams. Also, it is necessary to provide for a deeper seal, in many instances where a greated siphonic action exists. The nipple may, therefore, compensate for these differences in a like manner.

Referring again to Fig. 1 of the drawings, the piping there shown must pass an inspection; test being made whereby all the pipes are filled with water to find leaks. Heretofore, the fixtures could not be connected up with the system until such tests were made. Plugs were inserted into the pipes where the fixtures were to be inserted and remained in that condition until the tests were successful. This, therefore, delayed the work of the artisans installing the sewage system, and likewise the work of those to follow. With the present invention all the fixtures may be connected up, due to the thin wall which prevents water, or any other means used in such tests, from backing up into the fixtures, and after these tests are made, these thin walls are knocked out to allow a permanent clear passage through the system.

Referring now to Fig. 3, the fixture may be placed in such a position that it is necessary to use the fittings shown in full lines if the usual one-piece drum trap is used. As has been heretofore described, the inlet and outlet openings are usually provided on opposite sides of the drum trap. This necessitates the use of three lengths of pipe 24 and two fittings 25. Due to friction and angular turns, the stoppage is very pronounced in a connection of this kind and it is apparent that in case of stoppage, it would be very difficult to rod out.

In the present invention, the lower chamber is swivelled around to any desired position, and, as shown in dotted lines, by means of a single pipe 26 may be connected to the fixture. This connection may be easily rodded in case of stoppage, although it is obvious that stoppage is improbable due to a minimum amount of friction and no turns.

In the present day fixtures, built-in-bathtubs are becoming prominent. This lowers the bath tub to such an extent, that, were the outlet pipe to assume the same level it occupies when the bath tub is spaced above the floor, the bottom of the bath tub would lie in much the same plane as the outlet pipe and a very slow waste discharge would result. By means of reversing the upper chamber 15, the outlet pipe 20 would assume a lower position resulting in a faster flow of water from the bath tub and thereby flushing the tub.

While I prefer embodying my invention in the device herein shown and described, I do not desire to be limited to this exact structure or the details thereof. Various other arrangements of detail and structure will be apparent to one skilled in the art and, consequently, this invention is to be limited only by the scope of the appended claims and by the prior art.

Having described my invention, what I claim as new and desire to secure by Letters Patent of the United States is:

1. A waste trap construction comprising a chamber having an inlet, a second chamber in communication with said first chamber having an outlet in its side and an opening at each end, and means whereby either end opening of said second chamber may be alternatively placed in communication with said first chamber, said side outlet being nearer one end of said end openings than it is to the other, whereby when the connection is reversed the level of said outlet will be changed.

2. A waste trap construction comprising a lower chamber having an inlet in the side for direct connection with a horizontal inlet pipe, an upper chamber having an outlet in its side and an opening at each end, said chambers being substantially coaxial, a conduit affording communication between said chambers and detachably connected with both chambers whereby it may be disconnected and a conduit of a different length substituted, and means whereby either end opening of said upper chamber may be alternatively placed in communication with said lower chamber, said outlet being nearer one end of said upper chamber than it is to the other, whereby, when the connection is reversed the level of said outlet will be changed.

3. A waste trap construction comprising a lower chamber having an inlet in its side for direct connection with a horizontal inlet pipe, an upper chamber having an outlet in its side for direct connection with a horizontal outlet pipe, said chambers being substantially coaxial, and a conduit affording communication between said chambers and detachably connected with both of said chambers whereby it may be disconnected and a conduit of a different length substituted to adjust the positions of said horizontal inlet and outlet pipes relative to the distance between the axis thereof.

In witness whereof, I have hereunto subscribed my name.

WILLIAM J. McCARTHY.